United States Patent Office 2,875,063
Patented Feb. 24, 1959

2,875,063
FOOD PROCESS

Jacob R. Feldman, Maplewood, N. J., assignor to General Foods Corporation, White Plains, N. Y., a corporation of Delaware No Drawing. Application November 30, 1954
Serial No. 472,225

11 Claims. (Cl. 99—71)

The present invention relates to a natural coffee aroma of improved stability and a process for preparing the same. More particularly, the invention is concerned with an improved aroma obtained from coffee beans during the latter stages of roasting and during the grinding thereof.

Heretofore, attempts have been made to produce a dry extract of roasted coffee which when dissolved in hot water provides a beverage identical with freshly brewed coffee. These efforts have largely been in the direction of extracting ground roasted coffee to obtain an extract similar to that obtained by conventional coffee brewing and then drying said extract. Various methods of collecting a volatile coffee aroma for recombination with the liquid extract or with the powder resulting from drying the extract have also been employed.

Coffee aroma will vary in composition, amount and quality depending on the point in coffee processing or consumption at which the aroma is sampled. During the latter stages of roasting and during the period of time immediately following roasting, the coffee bean evolves the characteristic aroma of freshly roasted coffee. This aroma appears together with rather large quantities of carbon dioxide under pressure within the bean at the conclusion of the roasting process. Because of this internal pressure produced within the bean during roasting thereof, a fairly large quantity of aroma constituents together with carbon dioxide escape through the cell walls of the bean into the atmosphere. During grinding of freshly roasted beans, which in commercial practice usually follows immediately after the roasting step, a further amount of carbon dioxide together with the more volatile aromatic constituents are released from the cells ruptured during the grinding process.

Other sources of coffee aroma include "dry distillation" of ground roasted coffee beans under reduced pressure as described in U. S. Patent No. 2,680,687 to Lemonnier. In this patent the distillation process is described as "substantially" dry in that a small amount of water is present in the ground roasted coffee. The composition of this type of aroma varies considerably from that obtained during the roasting and grinding of coffee beans, and the quality thereof is generally considered less desirable. Another type of aroma includes that obtained by distilling an extract of ground roasted coffee beans, which differs considerably in quality from the other two types of aroma described and is also known to vary in composition. A closely related aroma is that given off by a cup of freshly brewed coffee, and this constitutes a still further type of coffee aroma.

Of the types of aroma described, that evolved during the later stages of roasting green coffee, and during subsequent grinding of the roasted coffee possesses highly desirable characteristics and has been found particularly useful when included in the gaseous state in a container of dry coffee extract. However, it has been found that a problem of degradation of this aroma on storage is encountered. This degradation is experienced to a greater degree when the aroma is subjected to temperatures appreciably below room temperature. At temperatures of about 0° F., the result of the degradation is the development of an "oniony" odor, which greatly reduces the acceptability of coffee packaged in this manner, and is highly undesirable.

The primary object of the present invention is to provide coffee aroma obtained during the latter stages of roasting green coffee beans and during the grinding of freshly roasted beans which is of improved stability in that it does not undergo the degradation on storage described in detail above.

It has now been found that the stability of coffee aromas obtained during the latter stages of roasting green coffee beans and during the grinding of freshly roasted coffee beans is greatly improved and that the development of undesirable odors is prevented by removing hydrogen sulfide from said coffee aromas. This result is surprising since hydrogen sulfide is considered a desirable component of natural coffee aroma and, moreover, it would not be expected that it is responsible for the development of the "oniony" off-odors which are developed at low storage temperatures. Herein and in the appended claims the term "aroma of freshly roasted coffee" is intended to mean the aroma that is collected during the latter stages of roasting green coffee beans and the aroma collected during grinding of freshly roasted coffee beans. It is intended to exclude from the definition of this term the aromas obtained during the so-called dry distillation of ground roasted coffee and the aromas obtained by distilling coffee infusions or coffee extracts, which aromas may be collectively termed "infusion aromas."

It has also been found that hydrogen sulfide may be removed from the aroma of freshly roasted coffee by a number of methods without removing substantial quantities of other valuable aromatic constituents, particularly the mercaptans. The preferred method of removing the hydrogen sulfide is to employ elemental copper or copper salts, either cuprous or cupric, such as copper acetate, copper sulfate, copper chloride, copper carbonate, and the like. Other copper compounds such as oxides, and hydroxides may be used. Further, various other heavy metals such as bismuth, chromium, magnesium, iron, cobalt, nickel, zinc, molybdenum, vanadium, silver, cadmium, tin, mercury, lead, titanium and salts, oxides and hydroxides thereof may be also employed to remove hydrogen sulfide from the aroma.

The effectiveness of the various materials employed above will depend on the state of subdivision and degree of activity of each particular substance being employed to remove the hydrogen sulfide, and the time of contact between aroma and hydrogen sulfide removing substance is measured accordingly. Copper in the form of turnings or shavings and copper acetate plated on porous chips have been found to function effectively in removing hydrogen sulfide from aroma of freshly roasted coffee.

Other methods for the removal of hydrogen sulfide include contacting the coffee aroma with adsorbents such as special clay, alumina, diatomaceous earth, activated charcoal, and the like. Also, any other well known method of removing hydrogen sulfide from a gas such as use of a volatile scavenger or simply passing the gas through water may be employed if desired.

An important consideration in removing the hydrogen sulfide from the aroma is that the removal process must be capable of removing from the natural aroma a major portion of the hydrogen sulfide while at the same time allowing substantially all of the desirable sulfur bearing compounds such as mercaptans to remain in the aroma. In most cases, the rate at which these desirable sulfur bearing compounds are removed is relatively slower than in the case of hydrogen sulfide. This was unexpected as it was known that both hydrogen sulfide and the desirable sulfur containing compounds such as mercaptans are removed from gases in the same manner.

A major part of the hydrogen sulfide removed from the untreated natural aroma according to this process is apparently originally present therein in a loosely combined state with other aroma constituents. The actual compound or compounds with which the hydrogen sulfide is combined are obscure. In any case it has been found that by regulating the period of contact of the aroma with the absorbent or adsorbent and by regulating the degree of activity of the particular adsorbent or absorbent a major portion of the loosely combined hydrogen sulfide is removed before a significant quantity of the more desirable sulfur containing materials are also removed. The thus treated natural aroma is stable over a wide range of storage conditions and is suitable for use in any manner desired.

The stabilized aroma may be employed in a variety of ways. Dry coffee extract may be packaged in an atmosphere of the stabilized aroma with the result that the container of dry coffee extract on opening will emanate an aroma similar to that obtained when opening a container of freshly ground coffee. Similarly, dry coffee extracts containing carbohydrates, termed "filled" coffee products, and cereal extracts or roasted cereal extracts such as those put out under the trademark "Instant Postum" may be enhanced with the improved aroma of this invention. Furthermore, dry coffee extracts or coffee substitutes which have been improved by the addition of flavoring principals to the dry extracts or during the course of preparing said extracts such as those described in U. S. Patent No. 1,367,725 to Charles F. Trigg; U .S. Patent No. 1,393,045 to J. W. Scott; and U. S. Patent No. 2,542,119 to H. Cole may also be enhanced by packaging the stabilized aroma therewith.

The process of the invention can best be illustrated by reference to grinder gas, which is released during grinding of roasted coffee beans. This gas also continues to evolve from the fractured beans for a short period after grinding and has a very pleasing aroma. Ordinarily, in the process of roasting and grinding coffee this aroma is largely lost to the atmosphere and thus its recovery and utilization represents an economy of operation not usually realized. The chemical composition of this gas is largely carbon dioxide together with a small amount of water vapor and the characteristic aromatic constituents.

In the collection step, the grinding equipment is enclosed, and the gases liberated from the ground coffee are removed by means of a rotary blower connected to the system by appropriate piping. Where desired, a stream of inert gas such as nitrogen may be used to sweep the gas from the coffee so that the grinding operation takes place in a substantially inert atmosphere. Such a process is described in U. S. Patent No. 2,156,212 to Wendt describing a method of collection of the gases evolved during roasting which method can be equally well applied to collection of grinder gases.

At this point, the collected gases are contacted with a suitable absorbent such as metallic copper turnings for a period of time sufficient to remove the aroma fraction contributing to aroma instability, while at the same time retaining the major part of the desirable sulfur-containing aroma constituents. Following the absorption step, the aroma gases may be condensed at very low temperatures. Alternately, the aroma may be condensed prior to treatment with the hydrogen sulfide absorbent but as this requires re-vaporization of the condensed material, treatment at this point in the process is somewhat inconvenient. Also, the step of hydrogen sulfide removal may be employed after vaporization of the frost but prior to its use in a gaseous state.

As the temperature of condensation is lowered the quality and quantity of aroma collected progressively improves. A temperature of about $-195°$ C., the temperature of liquid nitrogen, is the lowest practical temperature which can be obtained and accordingly is the preferred condensation temperature. However, good results are obtained with temperatures of $-78°$ C. or less, although the yield of aroma constituents is somewhat lower in this case and the aroma collected will contain a lesser amount of highly volatile materials.

The condensed aroma is in the form of a frost or snowlike material and may be easily handled providing a temperature of about $-75°$ C. is maintained. The frost is preferably transferred to a heavy container of inert metal capable of being sealed. This container with the frost is then stored at temperatures of from about $-70°$ C. to about $-195°$ C. until ready for use. The period during which this aroma is stored as a solid should be kept at a minimum to prevent undesirable changes due to contact of the aroma with metal.

The stabilized condensed grinder gas is now ready to be employed in any manner desired. Where, for example, it is desired to provide a container of dry coffee extract having an atmosphere aromatized with the stabilized aroma, the container and contents are evacuated to create a vacuum. This vaccum is then broken to an atmosphere of concentrated grinder gas front collected above, the same being provided by causing the frost to vaporize. The container is then sealed and is ready for marketing. Another method of providing the same desired aromatized container of dry soluble coffee involves the utilization of well known "plating" techniques whereby the frost is dissolved in a solvent and the liquid is sprayed uniformly over the dry powder prior to packaging thereof. A modification of this technique, wherein the frost in a finely divided state is uniformly mixed with the dry powder prior to packaging of the dry extract, may also be employed.

As above-mentioned, the gases released during the latter stages of roasting of coffee beans may also be improved according to this invention. Roaster gases, however, contain harsh principals such as acetic acid which should preferably be removed prior to removal of the hydrogen sulfide. Suitable methods for removing the harsh principals include cooling the roaster gases to $0°$ C. to condense water and other condensable materials, passing the vapors through an electrical precipitator to remove mist and entrained solid or liquid particles, and absorbing fatty materials in a suitable solvent. The thus purified aroma may then be processed as grinder gas.

As a specific example of the process of the present invention, roasted coffee is ground in regular production line grinding equipment which has been enclosed with sheet metal or similar material permitting withdrawal of the gases evolved during grinding. The gas as collected is passed through a tube having inside dimensions of 1¾ inches and being 4 feet in length. This tube contains 1 pound of copper turnings previously washed with acetone to remove contaminants. The grinder gas is passed through the tube at a velocity of approximately 1.5 cubic feet per minute at standard conditions with a resulting contact time of about 0.2 second. At this rate, 1 lb. of copper turnings will effectively treat about 300 cubic feet of grinder gas, considering the gases as collected, being 10% pure grinder gas and 90% air. The grinder gas is then conveyed to a surface cooled to about $-195°$ C. with liquid nitrogen where it is condensed as a frost. The frost is removed from the condensing device by means of a suitable scraper and deposited in a stainless steel container which has been previously chilled to about $-78°$ C. The container is then sealed and stored at this temperature.

It should be pointed out that the absorbent employed may be easily regenerated, once its effectiveness has been lost, by any of a number of suitable methods. In the case of elemental copper, the turnings may be subjected to an acid wash, followed by a wash with tri-sodium phosphate and a final rinsing with water and drying.

In the packaging operation, a glass jar having a capacity of 4 fluid ounces is filled to capacity with dry coffee extract and the air which remains in the jar, amounting to from 190–200 cubic centimeters, is removed therefrom by the application of a vacuum of 29.5 inches of mercury at standard conditions of temperature and pressure.

The grinder gas frost collected above is allowed to warm slightly in its container, causing it to vaporize and create pressure within said container. It is then released to the packaging system in controlled amounts. The packaging system includes an accumulating tank which acts as a reservoir of grinder gas under very slight pressure. The container filled with dry coffee extract is evacuated and the vacuum is broken by the admission of vaporized grinder gas.

The stabilized aroma thus obtained may be stored in a pressure cartridge at room temperature or in a hermetically sealed stainless steel container at about the temperature of Dry Ice. In addition, the aroma may be employed in its gaseous or solid state in aromatizing the void space of containers of dry coffee extract or similar beverage products. In this manner, a jar of a soluble coffee product is provided which not only on opening releases to the surrounding atmosphere the extremely pleasing aroma of freshly roasted coffee but also which on storage for prolonged periods of time over a wide temperature range will retain substantially the same quality aromatization as at the time of packaging.

It will be understood that while the invention has been described in part by means of specific examples, reference should be had to the appended claims for a definition of the scope of the invention.

What is claimed is:

1. A process for producing a coffee aroma composition comprising the aromatic volatile constituents of freshly roasted coffee and having improved stability on storage which comprises removing substantially all of the hydrogen sulfide from said collected constituents while leaving unremoved the desirable sulphur containing constituents.

2. A process for producing a coffee aroma composition comprising the aromatic volatile constituents of freshly roasted coffee and having improved stability on storage which comprises contacting said constituents with a hydrogen sulfide absorbent while leaving unabsorbed the desirable sulphur containing constituents.

3. The process of claim 2 wherein the hydrogen sulfide absorbent is clay.

4. The process of claim 2 wherein the hydrogen sulfide absorbent is copper.

5. In a process for aromatizing the void space in a container filled with a dry coffee extract the improvement which comprises the step of contacting aroma composition comprising the aromatic volatile constituents of freshly roasted coffee in a gaseous state with a hydrogen sulfide absorbent prior to introducing the aroma composition to said void space to achieve substantial removal of hydrogen sulfide from the aroma compound while leaving unabsorbed the desirable sulphur containing constituents.

6. A process for aromatizing the contents of a container of dry coffee extract comprising the steps of filling said container with dry coffee extract, evacuating said container and breaking the vacuum with an atmosphere of aroma composition comprising the aromatic volatile constituents of freshly roasted coffee stabilized by contact with copper to achieve substantial removal of hydrogen sulfide from the aroma compound while leaving unabsorbed the desirable sulphur containing constituents.

7. A process for aromatizing the contents of a container of a roasted cereal beverage product comprising the steps of filling said container with a roasted cereal beverage product, evacuating said container and breaking the vacuum with an atmosphere of aroma composition comprising the aromatic volatile constituents of freshly roasted coffee stabilized by contact with copper to achieve substantial removal of hydrogen sulfide from the aroma compound while leaving unabsorbed the desirable sulphur containing constituents.

8. A process for aromatizing the contents of a sealable container of dry coffee extract comprising the steps of filling said container with said extract, vacuumizing the filled container to withdraw air from the void space therein, condensing the aromatic volatile constituents of freshly roasted coffee, vaporizing the aroma condensate, contacting the vaporized coffee aroma composition with a hydrogen sulfide absorbent to achieve substantial removal of hydrogen sulfide from the aroma compound while leaving unabsorbed the desirable sulphur containing constituents, introducing the vaporized coffee aroma composition substantially free of hydrogen sulfide into said vacuumized chamber to at least partially fill the void space therein, and sealing the container with substantially all of the introduced coffee aroma composition retained therein.

9. A process for aromatizing the contents of a sealable container of dry coffee extract comprising the steps of filling said container with said extract, vacuumizing the filled container to withdraw air from the void space therein, grinding freshly roasted coffee and condensing the grinder gas produced thereby, heating the grinder gas condensate and contact the vapor produced with a hydrogen sulfide absorbent to achieve substantial removal of hydrogen sulfide from the aroma compound while leaving unabsorbed the desirable sulphur containing constituents, admitting the vaporized coffee aroma composition substantially free of hydrogen sulfide to said vacuumized chamber to at least partially fill the void space therein, and sealing the container with substantially all of the introduced coffee-aroma composition retained therein.

10. The process of claim 9 wherein the grinder gas is collected by condensation at −195° C. at the time of grinding the roasted coffee beans.

11. The process of claim 9 wherein the hydrogen sulfide absorbent is copper.

References Cited in the file of this patent

UNITED STATES PATENTS

| | | |
|---|---|---|
| 1,367,725 | Trigg | Feb. 8, 1921 |
| 1,393,045 | Scott | Oct. 11, 1921 |
| 1,479,852 | Englehardt | Jan. 8, 1924 |
| 1,597,964 | Gluud | May 24, 1927 |
| 1,854,847 | Kuhn | Apr. 19, 1932 |
| 2,156,212 | Wendt et al. | Apr. 25, 1939 |
| 2,403,319 | Williams | July 2, 1946 |
| 2,542,119 | Cole | Feb. 20, 1951 |
| 2,624,694 | Sailors | Jan. 6, 1953 |
| 2,680,687 | Lemmonier | June 8, 1954 |
| 2,689,795 | Olenikov | Sept. 21, 1954 |